United States Patent [19]
Lawrence et al.

[11] Patent Number: 5,958,243
[45] Date of Patent: Sep. 28, 1999

[54] APPARATUS AND METHOD FOR MEMBRANE FILTRATION WITH ENHANCED NET FLUX

[75] Inventors: Darren P. Lawrence, Hoevelaken; Theo A. A. Hellenkamp, Oudkarspel, both of Netherlands

[73] Assignee: Zenon Environmental Inc., Burlington, Canada

[21] Appl. No.: 08/804,279

[22] Filed: Mar. 3, 1997

Related U.S. Application Data

[60] Provisional application No. 60/021,594, Jul. 11, 1996.

[51] Int. Cl.⁶ .................................................. B01D 15/08
[52] U.S. Cl. .......................... 210/636; 210/137; 210/637; 210/321.65; 210/739; 210/741; 210/416.1; 210/321.69; 210/412
[58] Field of Search .................................. 210/137, 637, 210/321.65, 739, 741, 416.1, 636, 321.69, 412

[56] References Cited

U.S. PATENT DOCUMENTS

| | | | |
|---|---|---|---|
| 3,837,765 | 9/1974 | Weise et al. | 417/399 |
| 3,957,637 | 5/1976 | Morey | 210/73 |
| 4,219,421 | 8/1980 | Knibbs et al. | 210/98 |
| 4,753,733 | 6/1988 | Ramtack | 210/636 |
| 4,755,290 | 7/1988 | Neuman et al. | 210/138 |
| 4,921,610 | 5/1990 | Ford et al. | 210/636 |
| 4,955,953 | 9/1990 | Kayser | 184/42 |
| 4,978,506 | 12/1990 | Calderwood | 422/73 |
| 4,986,918 | 1/1991 | Breslau et al. | 210/652 |
| 5,009,775 | 4/1991 | Tsuji et al. | 210/85 |
| 5,011,603 | 4/1991 | Katoh et al. | 210/490 |
| 5,011,607 | 4/1991 | Shinzato | 210/637 |
| 5,047,154 | 9/1991 | Comstock et al. | 210/636 |
| 5,128,107 | 7/1992 | Katoh et al. | 422/129 |
| 5,234,605 | 8/1993 | Reipur et al. | 210/741 |
| 5,240,612 | 8/1993 | Grangeon et al. | 210/636 |
| 5,252,218 | 10/1993 | Muraldihara et al. | 210/636 |
| 5,354,466 | 10/1994 | Yunoki | 210/321.69 |
| 5,393,433 | 2/1995 | Espenan et al. | 210/650 |
| 5,512,167 | 4/1996 | Gramms et al. | 210/108 |
| 5,520,816 | 5/1996 | Kuepper | 210/649 |
| 5,580,221 | 12/1996 | Triezenberg | 417/44.2 |
| 5,589,076 | 12/1996 | Womack | 210/739 |
| 5,778,671 | 7/1998 | Bloomquist et al. | 60/456 |

FOREIGN PATENT DOCUMENTS

| | | |
|---|---|---|
| 2126922 | 5/1990 | Japan . |
| 2265628 | 10/1990 | Japan . |
| 1381410 | 1/1975 | United Kingdom . |

*Primary Examiner*—W. L. Walker
*Assistant Examiner*—Terry K. Cecil
*Attorney, Agent, or Firm*—Andrew Alexander

[57] ABSTRACT

A membrane filtration system which uses pump speed controllers to control flow rate and pressure during both the filtration cycle and the backwash cycle. The pump speed controllers operate by changing the frequency of AC current delivered to the pump motors, which changes the flow rate by changing the speed of the pump motor. The speed controllers operate by modulating the pump input power frequency in response to a signal from a flow or pressure signal received from a flow or pressure meter located on a liquid input pipe. This pump speed control method avoids the cyclical dampening patterns observed when trying to adjust pressure and/or flow rates by adjusting regulating valves. The system can also reduce or prevent formation of pressure spikes when switching from a filtration cycle to a backwash cycle, and vice versa. This reduces the likelihood of damage to the membrane from hydraulic pressure pulses. Finally, it offers the flexibility to provide pressure and flow pulses throughout the filtration and backwash cycles. These pulses have been found to dislodge foulants from the membrane while improving the net flux across the membrane, resulting in an increase in system productivity.

14 Claims, 4 Drawing Sheets

APPARATUS AND METHOD FOR MEMBRANE FILTRATION WITH ENHANCED NET FLUX

CROSS REFERENCE TO RELATED APPLICATION

This application claims the benefit of U.S. Provisional Application No. 60/021,594, filed Jul. 11, 1996.

FIELD OF THE INVENTION

The present invention relates to the filtration of liquid media using pressure as the driving force. More particularly, the invention relates to filtration such as microfiltration and/or ultrafiltration of a liquid medium using pressure to drive the liquid medium across a porous membrane with enhanced net flux.

Microfiltration and ultrafiltration are widely used in industry as separation techniques to remove impurities such as suspended solids from a liquid medium. In these techniques, a solution containing solute molecules of significantly greater dimensions than the solvent molecules, or a suspension containing colloidal particles or suspended particles, flows tangentially past a porous membrane under a defined driving pressure. This driving pressure is sufficient to force a portion of the solvent through the pores in the porous membrane. The undesired solute molecules or suspended particles are too large to pass through these pores. The solvent which passes through the membrane is removed as a purified permeate liquid, e.g., water, and the impurities are removed as a concentrate.

During use, the side of the membrane contacting the unfiltered liquid medium (the "concentrate side") can become fouled by particles or solute molecules retained by the membrane. Such foulants can decrease filtration efficiency by blocking access to the pores, making it more difficult for solvent to pass through the pores and decreasing the rate of solvent flow, or flux, through the membrane. To regain the original flux rate, the driving pressure on the liquid medium must be increased. This is undesirable because the filtration membrane can be damaged by application of excessive pressure during process and backwash flow.

Thus, filtration membranes must be periodically cleaned. This can be done by physically removing the membranes from the system and cleaning them; however, this leads to a shutdown of the filtration system for an extended period, with an accompanying productivity loss. It is more usual for a membrane to be cleaned while it is still in the system by process of "backwashing." Backwashing involves a reversing of liquid flow through the membrane. Liquid is forced under pressure to flow from the permeate side of the membrane to the concentrate side of the membrane. This causes the layer of foulant formed during filtration to be dislodged, resulting in significant flux recovery without application of excessive pressure. However, the time used for backwashing the membrane is lost to production, and the fluid used for backwashing is mixed with unfiltered process fluid and must be refiltered. For example, this strategy is used in hollow fiber microfiltration systems, which apply backwashes having a duration of 1 to 90 seconds to the microfiltration membranes, with the backwashes being timed to occur at intervals of 30 seconds to 90 minutes. Backwash duration and frequency is dependent on the filterability and fouling characteristics of the solids. These backwashes can lead to a productivity loss of up to 20% and usually only recover a fraction of the total flux. Reduction of backwash time and frequency, as well as increasing backwash effectiveness, are important to increasing the productivity of membrane filtration systems.

Figure 1:
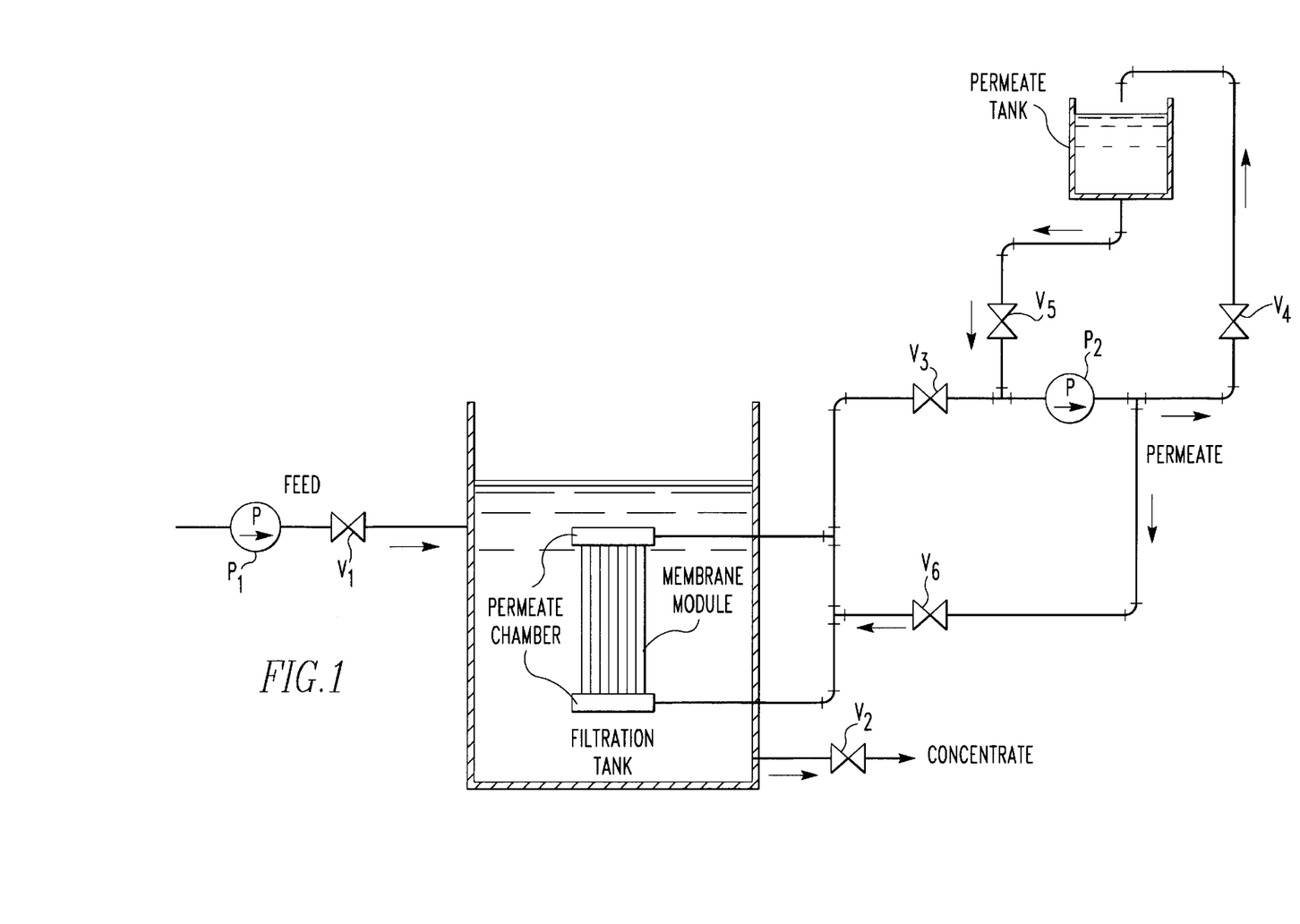
FIG. 1 illustrates a membrane filtration system having backwash capability.

Typically, flow reversal to effect a backwash procedure is done by manipulation of valves. In a submerged microfiltration system, shown in FIG. 1, a process fluid is contained in a filtration tank, and a microfiltration module is submerged in the process fluid. Pump P1 feeds the process fluid to the tank through valve VI, and the concentrate is extracted through valve V2 as required. Pump P2 extracts a portion of the solvent in the process fluid into the permeate chamber of the microfiltration module, and through valves V3 and V4 to a permeate tank. During the backwash step, removal of permeate from the tank is stopped by closing valves V3 and V4, and by simultaneously opening valves V5 and V6. The backwash fluid, which in most cases is permeate, but may also be tap water or a chemical solution, is pumped by pump P2 into the permeate chamber and escapes through the membrane module into the filtration tank, partially removing the foulant layer formed on the membrane. During the filtration stage, the pressure in the filtration tank is greater than the pressure in the permeate chamber. During the backwash stage, the pressure in the permeate chamber is greater than the pressure in the filtration tank.

Figure 2:
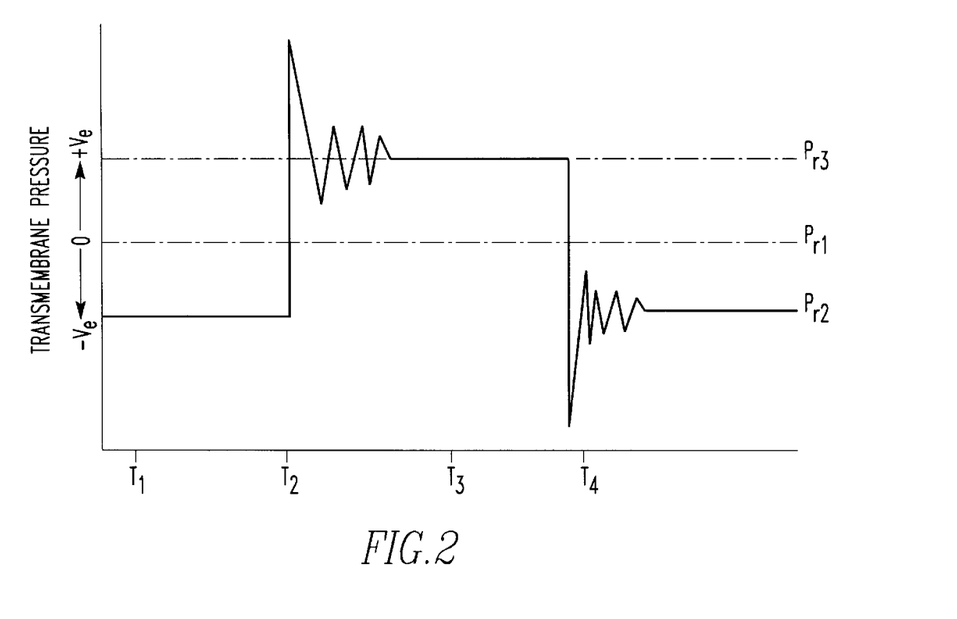
FIG. 2 is a graph of transmembrane pressure difference as a function of time in a filtration system undergoing a backwash procedure to clean the membrane.

In microfiltration and ultrafiltration systems, flow and pressure reversals are often accompanied by hydraulic pressure pulses that can damage the membrane, and result in a productivity loss. In the above-described system, during microfiltration at time T1, the pressure in the filtration tank is Pr1, which normally is equal to atmospheric pressure. The pressure in the permeate chamber is Pr2, where Pr2 is less than Pr1. Solvent is therefore sucked through the membrane from the filtration tank to the permeate chamber. At a later time T3, when backwashing of the membrane is underway, the pressure in the permeate chamber is P3, which is greater than P1, forcing the direction of fluid flow across membrane to reverse. The condition of the system at times T1 and T3 is a stable and steady state condition, as shown in FIG. 2. At time T2, the point in time where backwashing begins, valves V3 and V4 are closed and valves V5 and V6 are opened. Backwash fluid is then pumped into the permeate chamber, increasing the pressure in the permeate chamber. The rapid closing of valves V3 and V4 causes a short-lived, but large pressure spike in the permeate chamber. At the end of the backwash cycle (time T4), the positions of valves V3, V4, V5 and V6 are reversed, and a vacuum spike in the permeate chamber is generated. These spikes can damage the membrane, and should therefore be minimized, if not avoided altogether. Unfortunately, the conventional flow or pressure control systems used to regulate pressure or flow during filtration and backwash are unable to smoothly and quickly return flow rate and/or pressure to a steady state condition after a pressure spike or vacuum spike. These systems typically control pressure and flow by adjusting valves. However, a spike cannot be avoided, and loss of productivity results. Similarly, cyclical dampening patterns inherent in these systems increase the total time required to achieve steady condition. This leads to an increase in total backwash time, resulting in significant productivity loss.

Attempts to develop methods of reducing fouling that avoid the pressure pulses generated during backwashing have been described. For example, it is known to reduce fouling by generating a pulsed flow of liquid through the microfiltration module. For example, in British Patent 1,381, 410, Kroyer describes a technique for reducing fouling which involves flowing a concentrated liquid solution past one side of a membrane, and flowing a solvent past the other side of the membrane. The pressure on one side of the membrane is maintained at a defined constant value, while the pressure on the other side of the membrane is periodically varied, changing from a value higher than the defined value to a pressure lower than the defined value. This reverses the flow of fluid across the membrane and cleans the membrane. A similar system is seen in U.S. Pat. No. 5,011,607, issued to Shinzato.

Several systems which reduce fouling of a filtration membrane without requiring a backwash step have been proposed. One such system is described by Ramstack in U.S. Pat. No. 4,753,733. As membrane filtration proceeds, the level of fouling on the membrane increases, necessitating an increase in the transmembrane pressure difference to maintain a desired flow rate through the membrane. When the membrane is fouled to the extent that the transmembrane pressure difference reaches a defined ceiling value, the flow of permeate from the filtration module is stopped and the system transmembrane pressure is reduced to zero. The flow of process fluid is continued for a defined period of time to clear deposited impurities from the membrane. The permeate is then drawn from the filtration module at a slow but accelerating rate, causing the system transmembrane pressure to gradually rise to a desired value. This gradual increase seems to prevent the occurrence of pressure spikes. However, the extended interruptions in permeate flow during the foulant-removal stage and the slow restoration in permeate flow combine to cause serious reductions in productivity.

U.S. Pat. No. 5,240,612, issued to Grangeon et al., also describes a system that reduces fouling without requiring a backwash step. The system allows continuous filtration by passing a process liquid tangentially over a porous membrane while adjusting the flow rate of the liquid so as to establish a non-steady periodic flow. The driving pressure of the liquid, measured at the inlet of the filtration module, is essentially constant. The non-steady periodic flow rate of the process liquid reduces fouling of the membrane, without completely eliminating it. The reduction of fouling may arise from vibratory motion imparted to the membrane. If high flow rates are desired, a set of tubular filtration membranes must be used. A rotating disk having openings which allow unimpeded access by process fluid to tubular membranes having entrances directly behind the openings while allowing impeded access to the remaining membranes is then placed in the process stream between the pump and the filtration module.

Thus, it will be seen that there is a great need for an improved method and system which permits cleaning of the filtration membrane with only minimal interruption of productivity.

SUMMARY OF THE INVENTION

It is an object of this invention to provide a means for reducing fouling in a membrane filtration system which allows periodic reversal of fluid flow across the membrane (backwashing) while reducing or eliminating large hydraulic pressure pulses at the start and/or the completion of the backwash procedure.

It is a further object of this invention to provide a means for reducing fouling in a membrane filtration system by creating periodic pressure and/or flow pulses in the stream of process fluid during filtration to dislodge foulants from the membrane by, for example, imparting vibratory motion to the membrane.

It is a third object of this invention to provide a means for increasing efficiency of a backwashing process during membrane filtration by creating periodic pressure and/or flow pulses in the stream of backwash fluid to dislodge foulants from the membrane.

It is a final object of this invention to provide a novel membrane filtration system which, during normal operation, requires less power than prior filtration systems to achieve similar results.

These and other objects will be apparent from the specification, claims and drawings appended hereto.

In accordance with these objects, there is provided a system using pump speed controllers to control flow rate and pressure during both the filtration cycle and the backwash cycle. The pump speed controllers operate by changing the frequency of AC current delivered to the pump motors, which changes the flow rate by changing the speed of the pump motor. The speed controllers operate by modulating the pump input power frequency in response to a signal from a flow or pressure signal, for example, received from a flow or pressure meter located on a fluid input pipe. Thus, if a deviation from a desired flow rate is observed in the process fluid input pipe during normal filtration, a signal is sent by a flow meter on the process fluid input pipe to a flow controller, which modulates the speed of the process fluid input pump to adjust the flow rate to the desired value. Pressure deviations can be corrected in a similar manner. Alternately, a programmable logic controller (PLC) or a timer device may be used to modulate the speed of the pump in a cyclical fashion to generate flow and pressure pulses during filtration and backwash. This pump speed control method substantially avoids the cyclical dampening patterns observed when trying to adjust pressure and/or flow rates by adjusting regulating valves, and results in unobvious characteristics and benefits. The proposed system is highly stable, and provides smooth and rapid return to steady state conditions during filtration and backwash cycles. The system can also reduce or prevent formation of pressure spikes when switching from the filtration cycle to the backwash cycle, and vice versa, resulting in a reduction of the duration of the backwash cycle. Finally, the system offers the flexibility to provide pressure and flow pulses throughout the filtration and backwash cycles. These pulses have been found to improve the instantaneous filtration flux across the membrane, resulting in an increase in system productivity.

DESCRIPTION OF THE PREFERRED EMBODIMENTS

Figure 3:
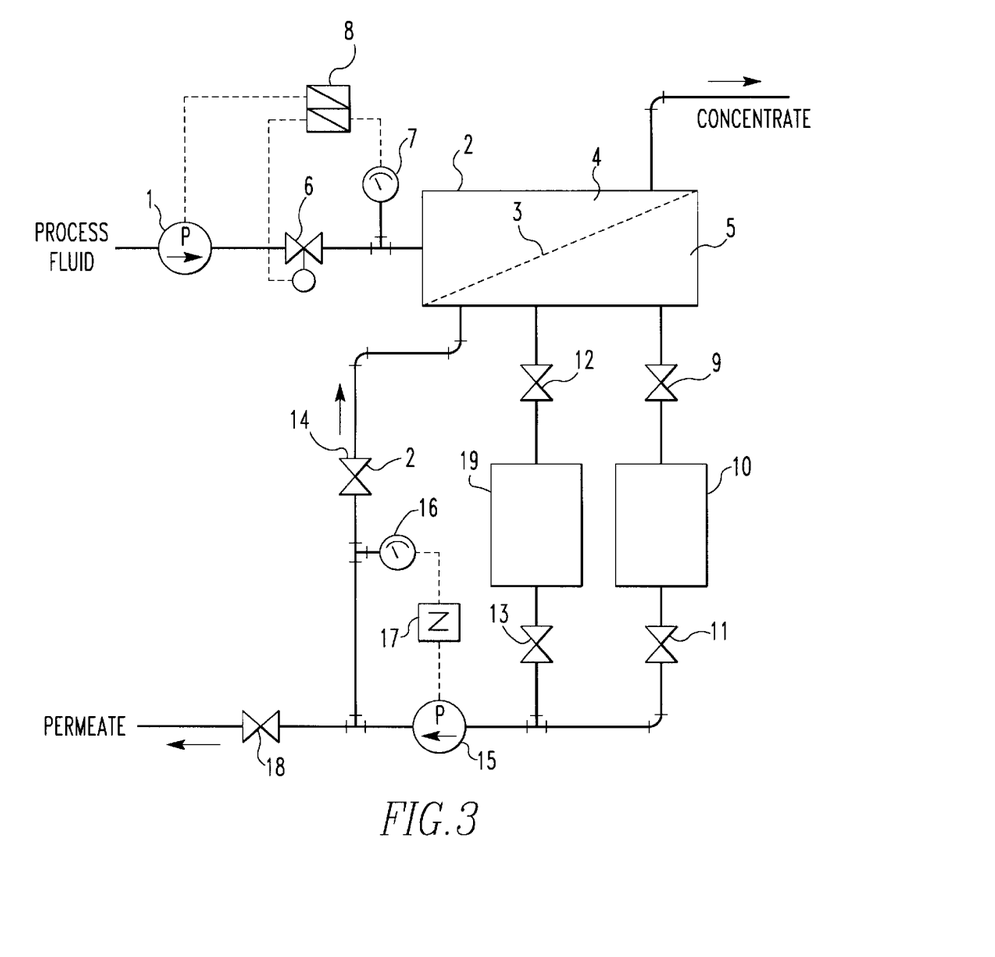
FIG. 3 illustrates a membrane filtration system in accordance with the present invention.

FIG. 3 shows a membrane filtration system in accordance with the present invention. This system is capable of operating in a filtration mode, or in a backwash mode. During the filtration mode, process fluid is pumped by pump 1 through valve 6 into a process chamber 4 of filtration module 2. Process chamber 4 is separated from a permeate chamber 5 of module 2 by a porous membrane 3, which may be either a microfiltration membrane, an ultrafiltration membrane or other membrane used for filtration. The driving pressure exerted by pump 1 on the process fluid causes a portion of the solvent or liquid, e.g., water, in the process fluid to pass through membrane 3 into permeate chamber 5. The remaining solvent or liquid, together with impurities which are too large to pass through the membrane, leaves the filtration module as a concentrate solution. The permeate leaves the filtration module through valve 9, passes through permeate storage tank 10, exits tank 10 through valve 11, and is discharged through valve 18 and pump 15. During this process, valves 12, 13, and 14 are closed. However, valve 12 may be opened for brief periods during filtration to divert some of the permeate leaving the filtration module to a clean-in-place tank 19, where permeate solution is stored for later use during a backwash cycle.

In accordance with the invention, in the filtration system there is provided a mechanism for controlling flow rate of process fluid entering filtration module 2. A flow meter 7 is located on the process fluid input pipe, and if a deviation from a desired preset flow rate is sensed by flow meter 7, a signal is sent to pump speed controller 8. Pump speed controller 8 then adjusts the frequency of the AC current supplied to the pump motor, changing the pump speed. Thus, if the flow meter senses that the flow rate of process fluid is too low, the speed controller 8 will cause the pump speed to increase, returning the flow rate to a desired value. An example of a pump speed controller that is suited to this use is Siemens Electric Limited's RECLON QC Series Variable Speed AC Motor Drive Q25008. If desired, flow meter 7 may be replaced by a pressure gauge which measures the pressure in the process fluid input pipe. Such a pressure gauge allows or permits modulation of the pump speed so as to maintain a desired pressure at the entrance to process chamber 4. Alternatively, meter 7 may be replaced by a gauge adapted to measure the transmembrane pressure difference by determining the pressure difference between the entrance to chamber 4 and the exit from permeate chamber 5. A signal from such a transmembrane pressure difference gauge may then be used by pump speed controller 8 to modulate the pump speed so as to maintain the transmembrane pressure difference at a desired value. A programmable logic controller may be used to provide a signal to pump speed controller 8 to modulate the pump speed to maintain the desired pressure.

In addition to modulating the pump speed in response to signals from a flow meter or pressure gauge, etc., to maintain the process fluid flow rate or pressure at a desired preset value, the pump speed modulator or controller may be set to create periodic pulses in the pressure and/or flow rate of the process fluid by varying the frequency of the power supplied to the pump motor in a cyclical fashion. This may be achieved, for example, by the use of a timer or a programmable logic controller. These pressure and flow pulses may be created at a frequency of from 10 pulses per second to 1 pulse every 30 seconds. The pulses generated by periodically varying the speed of the pump can impart vibratory motion to membrane 3, dislodging foulant particles from the membrane. This enhances the flow rate across the membrane and increases system productivity. Additionally, the frequency at which filtration will have to be interrupted to clean the membrane is reduced.

The system of FIG. 3 may also be operated in a backwash mode, allowing the flow across the membrane to be reversed to dislodge any foulant particles which have adhered to membrane 3. In this mode of operation, the influx of process fluid to chamber 4 is shut off by turning off pump 1 and closing valve 6. The efflux of permeate from chamber 5 is likewise shut off by closing valves 9, 11, 12, and 18 while opening valves 13 and 14. During the backwash process, pump 15 withdraws permeate fluid from storage tank 19 through valve 13 and pumps it through valve 14 into chamber 5 of filtration module 2. When the pressure in chamber 5 exceeds the pressure in process chamber 4, the permeate fluid pumped into chamber 5 will pass through the membrane into process chamber 4. This dislodges the layer of particulate matter deposited on the side of the membrane which contacts the process fluid in chamber 4, cleaning the membrane.

The pressure of the fluid entering chamber 5 of the filtration module during backwash is controlled by pump speed controller 17. Controller 17 receives a signal giving the pressure in the backwash fluid input pipe from pressure gauge 16. If the pressure gauge signals that the pressure is not at a desired value, controller 17 adjusts the frequency of the power provided to pump 15. This changes the speed of the pump, and adjusts the pressure in the input line. For example, if the pressure in the input line is too low, controller 17 increases the frequency of the power provided to pump 15. This increases the speed of the pump and increases the pressure of the fluid in the backwash fluid input line. Alternatively, gauge 16 can be replaced with a gauge which measures the difference in pressure between the fluid in the backwash fluid input line and the concentrate output line. This difference is approximately equivalent to the transmembrane pressure difference. The pump controller can then modulate the pump speed in response to a signal from the transmembrane pressure gauge to maintain the pressure drop across membrane 3 at or near a desired value. This has the advantage of reducing the likelihood of membrane damage from an excessive transmembrane pressure difference.

As with pump controller 8, pump controller 17 may also be set to modulate the pump frequency in a cyclical manner, rather than simply adjust the pump frequency to maintain a desired preset pressure in the backwash fluid input line. By modulating the speed of the pump in a cyclical manner, pressure and flow pulses are created in the backwash fluid entering chamber 5. These pressure and flow pulses may be created at a frequency of from 10 pulses per second to 1 pulse every 30 seconds. These pulses impart vibratory motion to membrane 3. The vibratory motion enhances backwash efficiency by dislodging foulants from the membrane. This reduces the amount of time required to carry out an effective backwash and increases system productivity.

This system has several advantages over prior membrane filtration systems. First, significant power savings are achieved by using pump speed controllers to control flow rates by reducing power to the motor. In prior filtration systems, flow rates are controlled by means of a flow control valve system. To reduce flow rates, the pressure drop over the appropriate valve or valves is increased while continuing to operate the pump at essentially full power. As an example, to maintain the flow rate into process chamber 4 at ½ of the maximal flow rate, we have found that the energy used by pump 1 when flow rate is controlled by a pump speed controller is approximately one-eighth of the energy used by a similar pump when flow rate is controlled by adjusting the pressure drop across a flow control valve.

In a second advantage of the invention, the existing filtration systems can be adapted to the new control system with minimal retrofitting. Unlike prior systems, where the microfiltration system has to be adapted to handle entirely new components (i.e., the rotating disk described by Grangeon et al.), one merely has to connect each pump to a pump speed controller and adapt the pump speed controllers to respond to signals from existing pressure and/or flow meters, for example, in the system. This means that the cost of changing from an existing system to the system of the invention is minimized. Additionally, this system can be used with any configuration of filtration membrane (i.e., a planar membrane, a tubular membrane, etc.). It can similarly be used with any kind of filtration membrane including ultrafiltration membranes and microfiltration membranes. The invention has the advantage that increased flux is obtained because the membrane is more efficiently and thoroughly cleaned.

Finally, the pump speed controllers are useful for substantially avoiding or reducing the magnitude of hydraulic pressure spikes upon switching from a filtration mode to a backwash mode, and vice versa. In the prior systems, such pressure pulses arise when a pump is suddenly turned on at full power and the pressure exerted by incoming fluid on the membrane in the filtration module is only then modulated by reducing the flow rate by adjusting a valve in the input line. Typically, in prior systems the adjustment initially overcompensates for the excess pressure, and reduces the flow rate too much. This starts a cyclical dampening pattern that delays the establishment of a steady state in the system and lowers productivity. The pump speed controllers in the system in the present invention facilitate smoothly establishing controlled flow after transition from a filtration mode to a backwash mode. For example, pump speed controller 17 can be programmed to start pump 15 at a low speed at the start of a backwash procedure, rather than to start pump 15 at full speed. This reduces the pressure applied to the permeate side of membrane 3 at the start of the backwash procedure, and hence either prevents or reduces the magnitude of hydraulic pressure pulses. If the pressure of the backwash fluid entering the permeate chamber, as measured by pressure gauge 16, is too low, pump speed controller 17 can be programmed to automatically increase the speed of pump 15. Similarly, if the backwash pressure is too high, controller 17 automatically decreases the speed of the pump. After the backwash cycle is completed and the positions of the valves are positioned correctly, normal filtration commences. Pump speed controller 8 can be programmed to start pump 1 at a low speed, so as to not to pump process fluid into process chamber 3 at an excessively high rate. If flow meter 7 reports that the flow rate is higher than desired, controller 8 reduces the speed of pump 1; if the flow rate is lower than desired, controller 8 increases the speed of pump 1. Control of flow rate in this manner prevents fluid from entering chamber 4 too rapidly and avoids excess pressure buildup in chamber 4.

The specific details of a membrane system filtration and backwash control loop incorporating a variable speed drive includes a flow transmitter (FT) which reads the flow of the fluid in the pipe and transmits this information in the form of a current (typically 4–20 mili-amp) or potential (4–20 mV) signal to a flow indicator/controller (FIC). The FIC converts this signal into a flow reading, compares it with the set point entered by an operator, and sends a 4–20 mA or 4–20 mV signal to a pump speed controller. The speed controller acts by changing the frequency of the electric current to the pump motor in proportion to the signal presented by FIC, which results in a change in the motor speed, and hence, the pumping rate and pressure generated by the pump. The permeate or backpulse flow generated by the pump then can be vibratory in nature to achieve improved filtration and membrane cleaning during backwash.

Alternately, a timing device may be used to enter a cyclic signal vibration pattern. This cyclical pattern may be transmitted to the pump speed controller in the form of a 4–20 mA signal, which may then act to change the speed of the pump as described above. The rate of change of current frequency may be rapid or slow, depending on the requirements of the process.

Both flow set point for flow indicator/controller FIC and timer adjustment for the timing device may be carried out by a programmable logic controller which may incorporate flow and pressure control patterns for both filtration and backwash segments.

Thus, this system prevents damage to the membrane by reducing the occurrence and magnitude of hydraulic pressure pulses upon reversing fluid flow through the membrane. Additionally, the cyclical dampening patterns observed when adjusting flow rates using valves are substantially avoided. Use of a pump speed controller to adjust flow rates by adjusting pump speed in response to flow and/or pressure measurements achieves a smooth transition to a steady-state flow rate. This reduces the backwash time by 1% to 50%, with an accompanying increase in net flux and system productivity.

While two pumps 1 and 15 have been illustrated, it will be appreciated that a single pump with suitable valving may be employed for filtration and backwash cycle.

Figure 4:
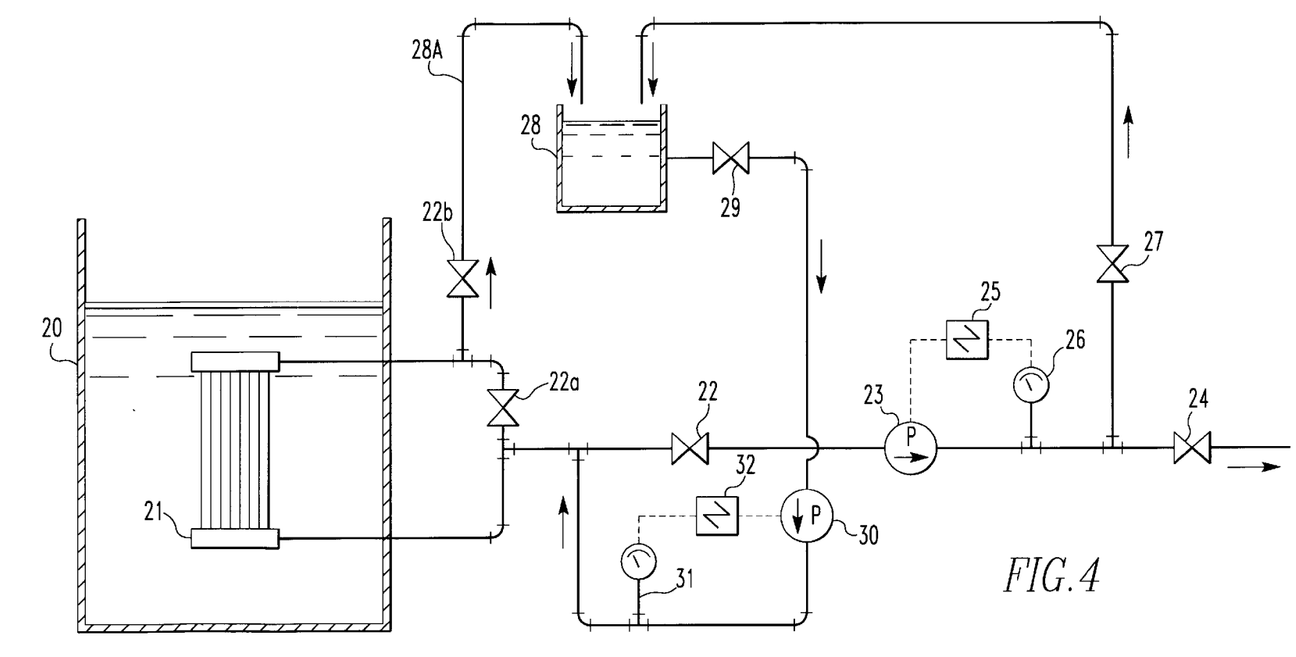
FIG. 4 illustrates other embodiments of a membrane filtration system in accordance with the present invention.

The invention described herein may also be applied to suction filtration systems, such as the system shown in FIG. 4. In this system, a filtration membrane 21 is located in a tank 20 of fluid to be filtered. During a filtration cycle, valves 22, 22*a* and 24 are open and valves 22*b*, 27 and 29 are closed. Pump 23 applies a negative pressure across the membrane and draws permeate through the membrane. Pump 23 draws the permeate through valve 22, and discharges the permeate through valve 24. Periodically during filtration, valve 27 may be opened to divert some of the permeate to storage tank 28. The speed of pump 23 is modulated by speed controller 25, in response to flow meter 26. If flow meter 26 indicates that the flow of permeate withdrawn through the membrane is lower than desired, the speed of pump 23 is increased by controller 25. If meter 26 indicates that the flow is too high, the pump speed is decreased. This allows the flow of permeate to be maintained at a desired steady-state value. Controller 25 may be set to vary the speed of pump 23 in a cyclical manner, creating pulses in the flow of permeate across membrane 21. It is believed that this vibrates the membrane, reducing fouling by dislodging foulants from the membrane. Finally, at the start of a filtration cycle, controller 25 may be used to adjust the pump speed in response to signals from flow meter 26 so as to provide a smooth transition to controlled flow, while substantially avoiding sharp spikes in the vacuum applied across the membrane and returning the system to steady state operation rapidly.

During the backwash cycle, valves 22, 22*b*, 24, and 27 are closed, and valves 29 and 22*a* are opened. Backwash fluid is drawn from storage tank 28 through valve 29 by pump 30, and is pumped through membrane 21 to dislodge foulants deposited on the membrane. Pump controller 32 modulates the speed of pump 30 in response to signals from pressure gauge 31. For example, if the pressure of the backwash fluid is too low, the speed of pump 30 is increased. Controller 32 also can modulate the speed of pump 30 in a cyclical fashion to achieve predefined pressure and flow pulses during the backwash cycle to enhance the efficiency of membrane cleaning by vibrating membrane 21. Finally, at the start of a backwash cycle, controller 32 may be used to adjust the pump speed in response to signals from pressure gauge 31 so as to substantially avoid sharp spikes in the pressure applied across the membrane and achieving steady state backwash conditions rapidly.

An alternate backwash cycle consists of closing valve 22a and opening valve 22b. The cleaning solution is then circulated from tank 28, through valve 29, pump 30 to the bottom of the permeate module header. It then flows upwards through membrane 21 lumen and through valve 22b and line 28a, returning to tank 28. Valving arrangement to obtain flow of fluid down through membrane 21 lumen may also be used. Part of the solution flows through the membrane pores into tank 20, dislodging foulants deposited in the membrane. Pump controller modulates the speed of pump 30, as described above to generate pressure and flow pulses, and to return the system to steady conditions rapidly at the start of filtration and backwash cycles. The advantage of this approach is that while cleaning the membrane, it can also purge air accumulated in the membrane lumen, permeate header and piping. This air accumulation is caused by the infiltration of air bubbled in tank 20 for membrane cleaning purposes, through the membrane pores into the permeate system. However, backwashing in a pulsing mode in the present invention has the advantage that it significantly reduces the amount of air used and the cost of providing air for cleaning the foulant from the membrane.

While two pumps 30 and 23 have been illustrated, it will be apparent that a single pump with suitable valving may be used for filtration and backwash cycles.

The microfiltration or ultrafiltration system in accordance with invention can be applied to industrial and municipal wastewater feed streams, drinking water, boiler feed water, landfill leachates and juice production.

EXAMPLE

This example demonstrates the improvement in membrane permeability obtained using the invention. That is, in a conventional system, the flow rate was 1.9 gal/ft$^2$/day/psi. Using the invention, the flow rate was increased to 13.1 gal/ft$^2$/day/psi. Microfiltration of effluent in an activated sludge wastewater treatment system at a dairy plant was carried out using two microfilters, type ZW-150, manufactured by Zenon Environmental, Inc. The microfiltration modules were made from hollow fibers with an outside diameter of 2 mm and an inside diameter of 1 mm. Total available filtration area was 300 square feet. Each microfiltration module was approximately 72 inches high with each fiber approximately 59 inches long and potted at both ends in a header to isolate the filtered water from the activated sludge liquor. The microfilter was located in a bioreactor tank to which raw wastewater was introduced for treatment. The tank was under atmospheric pressure and negative pressure was maintained in the microfilter header to provide the driving force for filtration. The permeate was flowed through the outside separating layer of the fibers, through fiber lumen, through the header, piping and a pump. The same pump was also used through suitable valving arrangement to reverse the direction of flow under pressure, which caused the clean permeate to flow through the membrane in a direction opposite to normal filtration to accomplish backwash. The backwash was accomplished in two modes: (1) dead-end mode in which the cleaning solution was pumped under pressure through both headers, and some flowed through the membrane pores out to the tank to remove some of the fouling layer to achieve partial restoration of membrane productivity; and (2) recirculation mode in which the cleaning solution was introduced at the bottom header, flowed through the lumen of the membrane under pressure and escaped at the top back to the inlet of the pump. Because the liquid inside the lumen was under pressure, some of the fluid flowed through membrane pores to the tank to remove some of the fouling layer to achieve partial membrane cleaning.

Backwash, using the conventional method of reversing the flow through the membrane was used. The sequence involved: (1) flowing effluent to the microfiltration chamber for 360 seconds; (2) reversing the flow and recirculating wash solution back through the microfilter under pressure to achieve backwashing for 40 seconds; (3) again reversing directing and flowing effluent to the microfiltration chamber for another 360 seconds; and then (4) dead-end backwashing the microfilter for 40 seconds.

The membrane productivity under these conditions was 1.9 gal/ft$^2$/day/psi. A backwash was incorporated in accordance with the invention using vibratory backwash generated by a speed controlled permeate/backwash pump. This sequence involved: (1) flowing effluent to the microfiltration chamber for 300 seconds; (2) reversing flow direction and recirculating backwash solution through the microfiltration membrane for 40 seconds; again reversing direction and flowing effluent to the microfiltration chamber for 300 seconds. A vibratory backwash was used on a speed controller on the backwash pump, incorporating a 4 second pulse at high flow (7.05 gpm) and high pressure (11.6 psi), and 3 second pulse at low flow (0.9 gpm) and low pressure (0.7 psi). Each pulse was repeated five times during the total 40 second backwash sequence.

Microfilter permeability increased to 13.1 gal/ft$^2$/day/psi immediately after the implementation of vibratory backwash from a permeability of 1.9 gal/ft$^2$/day/psi using prior backwash. This approximately seven-fold improvement in the membrane permeability demonstrates the effectiveness of the claimed invention for enhancing the performance of microfiltration membranes.

While the invention has been described in terms of preferred embodiments, the claims appended hereto are intended to encompass other embodiments which fall within the spirit of the invention.

What is claimed is:

1. A method of filtering a liquid at a controlled rate of flow using a membrane filtration system to provide enhanced net flux having:

(a) a source of liquid to be filtered;

(b) a feed pump having a controllable speed adapted to pump liquid to be filtered from the source of liquid through a feed conduit to the system at a controlled rate;

(c) a filtration module comprised of a nano-, micro- or ultra-filtration membrane, the module adapted to receive liquid to be filtered from the feed conduit through an inlet opening and direct the flow of the liquid to be filtered across a porous membrane mounted in the filtration module;

(d) a permeate conduit adapted to carry liquid which has been filtered through the membrane in the filtration module out of the filtration module through a permeate outlet opening wherein said permeate conduit can be closed with a first valve;

(e) a concentrate conduit adapted to carry unfiltered liquid out of the filtration module through a concentrate outlet opening;

(f) a backwash conduit through which liquid enters the permeate chamber during a cleaning operation wherein said backwash conduit can be opened with a second valve;

(g) a backwash pump for pumping backwash liquid through the backwash conduit into the permeate chamber during a cleaning operation;

(h) a means for closing the first valve and opening the second valve when the backwash pump in running; and (i) backwash liquid pressure controlling means for controlling the pressure of the backwash liquid in the backwash conduit, the method comprising:

(i) pumping liquid to be filtered through the feed conduit into the filtration module;

(ii) withdrawing filtered liquid from the filtration module through the permeate conduit and withdrawing unfiltered liquid through the concentrate conduit;

(iii) measuring the rate at which liquid to be filtered flows through the feed conduit to provide a measured flow rate;

(iv) comparing the measured flow rate to a preset flow rate to determine whether the measured flow rate differs from the preset flow rate;

(v) if the measured flow rate is different from the preset flow rate, adjusting the rate at which liquid to be filtered flows through the feed conduit until the rate at which liquid flows through the feed conduit is equal to the preset flow rate by adjusting the speed of the pump; and periodically backwashing said membrane by:

(vi) closing said permeate conduit and opening said backwash conduit;

(vii) pumping backwash liquid through said backwash conduit into said permeate chamber; and (viii) controlling the pressure of the backwash liquid in the backwash conduit using said backwash liquid controlling means, said backwash liquid controlling means comprising a backwash pump speed controller for adjusting the pressure of the backwash liquid by adjusting the speed of backwash pump, said speed controller controlling said backwash pump and generating pulses in the backwash liquid to dislodge foulants from said membrane to provide said enhanced net flux.

2. The method of claim 1 including providing a pump having an electric motor which runs on AC current, and adjusting the speed of the pump by changing the frequency of AC power supplied to the pump motor.

3. The method in accordance with claim 1 including the step of generating periodic pressure pulses or flow pulses in the liquid entering the filtration module through the feed conduit using a feed pump speed controller to vary the speed of the pump in a periodic fashion.

4. The method in accordance with claim 1 including:

(a) starting the feed pump at a predetermined speed;

(b) using the feed pump to pump liquid to be filtered through the feed conduit into the filtration module;

(c) measuring pressure or rate of liquid flowing through the feed conduit immediately after the pump starts to provide a measured flow rate or pressure;

(d) comparing the measured flow rate or pressure to a preset flow rate or pressure to determine whether the measured flow rate or pressure differs from the preset flow rate or pressure; and (e) if the measured flow rate or pressure is greater than the preset flow rate or pressure, adjusting the rate or pressure of liquid flowing through the feed conduit by decreasing the speed of the pump, or increasing the speed of the pump if the measured flow rate or pressure is less than the preset flow rate or pressure, thereby substantially eliminating large hydraulic pressure pulses upon reversal of flow for backwashing.

5. A method of membrane filtration with enhanced flow rate control, using a membrane filtration system having:

(a) a source of liquid to be filtered;

(b) at least one filtration membrane separating the liquid to be filtered from a permeate chamber; and (c) a suction pump having a controllable speed adapted to withdraw liquid to be filtered through the membrane to provide a permeate to be removed as filtered fluid from the permeate chamber through a permeate conduit which can be closed by a first valve, a backwash conduit through which liquid enters the permeate chamber during a cleaning operation wherein said backwash conduit can be opened with a second valve, a backwash pump for pumping backwash liquid through the backwash conduit into the permeate chamber during a cleaning operation; a means for closing the first valve and opening the second valve when the backwash pump in running; and backwash liquid pressure controlling means for controlling the pressure of the backwash liquid in the backwash conduit, the method comprising:

(i) using the suction pump to withdraw the filtered liquid from the permeate chamber through the permeate conduit;

(ii) measuring the rate or pressure of liquid flowing through the permeate conduit to provide a measured flow rate or pressure;

(iii) comparing the measured flow rate or pressure to a preset flow rate or pressure to determine if the measured flow rate or pressure differs from the preset flow rate or pressure; and (iv) if the measured flow rate or pressure differs from the preset flow rate or pressure, adjusting the rate or pressure of liquid flowing through the permeate conduit until the flow rate or pressure equals the preset flow rate or pressure by adjusting the speed of the pump, periodically backwashing said membrane by:

a. closing said permeate conduit and opening said backwash conduit;

b. pumping backwash liquid through said backwash conduit into said permeate chamber; and c. controlling the pressure of the backwash liquid in the backwash conduit using said backwash liquid controlling means, said backwash liquid controlling means comprising a backwash pump speed controller for adjusting the pressure of the backwash liquid by adjusting the speed of backwash pump, said speed controller controlling said backwash pump and generating pulses in the backwash liquid to dislodge foulants from said membrane to provide said enhanced net flux.

6. The method of claim 5 including providing the pump with an electric motor which runs on AC current, and adjusting the speed of the pump by changing frequency of AC power supplied to the motor.

7. In a membrane filtration system comprising:

(a) a filtration module comprising a concentrate chamber and a permeate chamber separated by a filtration membrane;

(b) a pump having a controllable speed for driving liquid to be filtered through the membrane from the concentrate chamber to the permeate chamber;

(c) a permeate conduit through which liquid which has been filtered by passage through the membrane is removed from the permeate chamber during filtration wherein said permeate conduit can be closed with a first valve;

(d) a backwash conduit through which filtered liquid enters the permeate chamber during a cleaning operation wherein said backwash conduit can be opened with a second valve;

(e) a backwash pump for pumping backwash liquid through the backwash conduit into the permeate chamber during a cleaning operation;

(f) a means for closing the first valve and opening the second valve when the backwash pump is running; and (g) backwash liquid pressure controlling means for controlling the pressure of the backwash liquid in the backwash conduit, said pressure controlling means comprising a backwash pump speed controller for adjusting pressure of the backwash liquid by cyclically varying the speed of the pump in a predetermined manner, the backwash speed controller having the ability to generate pulses in the backwash liquid by cyclicalling varying the speed of the pump.

8. The system of claim 7 wherein the pressure controlling means comprises:

(a) a pressure sensor adapted to measure the pressure of the backwash liquid flowing through the backwash conduit to provide a measured pressure; and (b) a backwash pump speed controller for:
  (i) comparing the measured pressure to a preset pressure to determine whether the measured pressure differs from the preset pressure; and
  (ii) if the measured pressure differs from the preset pressure, adjusting the pressure of the backwash liquid in the backwash conduit until the backwash liquid pressure matches the preset pressure by adjusting the speed of the backwash pump.

9. The system of claim 7 wherein the pressure controlling means comprises a backwash pump speed controller adapted to vary the speed of the pump to cyclically vary the pressure of the backwash liquid flowing through the backwash conduit.

10. A method of cleaning a filtration membrane with increased efficiency using a system having:

(a) a filtration module comprising a concentrate chamber and a permeate chamber separated by a filtration membrane;

(b) a pump for pumping liquid to be filtered through the membrane from the concentrate chamber to the permeate chamber;

(c) a permeate conduit through which liquid which has been filtered by passage through the membrane is removed from the permeate chamber during filtration wherein said permeate conduit can be closed with a first valve;

(d) a backwash conduit through which filtered liquid enters the permeate chamber during a cleaning operation wherein said backwash conduit can be opened with a second valve;

(e) a backwash pump having a controllable speed for pumping backwash liquid through the backwash conduit into the permeate chamber during a cleaning operation; and (f) a means for closing the first valve and opening the second valve when the backwash pump is running, the method comprising:
  (i) closing the first valve and opening the second valve;
  (ii) starting the backwash pump and pumping backwash liquid through the backwash conduit, into the permeate chamber, and through the membrane for a predetermined period of time to dislodge foulants which have collected on the membrane;
  (iii) measuring the pressure of the backwash liquid in the backwash conduit;
  (iv) comparing the pressure of the backwash liquid to a preset pressure to determine if they differ;
  (v) if the pressure of the backwash liquid differs from the preset pressure, adjusting the pressure of the backwash liquid by adjusting the speed of the backwash pump until the pressure of the backwash liquid is equal to the preset pressure;
  (vi) during said pumping of said backwash liquid, varying the pressure of the backwash liquid flowing through the backwash conduit to create pressure pulses in a periodic fashion by cyclically varying the speed of the backwash pump; and
  (vii) at the end of the predetermined period of time, stopping the backwash pump, closing the second valve, and opening the first valve.

11. The method of claim 10 including performing steps (iii), (iv), and (v) immediately after the backwash pump is started.

12. A method of cleaning a filtration membrane with increased efficiency using a system having:

(a) a filtration module comprising a concentrate chamber and a permeate chamber separated by a filtration membrane;

(b) a pump which drives liquid to be filtered through the membrane from the concentrate chamber to the permeate chamber;

(c) a permeate conduit through which liquid which has been filtered by passage through the membrane is removed from the permeate chamber during filtration wherein said permeate conduit can be closed with a first valve;

(d) a backwash conduit through which filtered liquid enters the permeate chamber during a cleaning operation wherein said backwash conduit can be opened with a second valve;

(e) a backwash pump having a controllable speed for pumping backwash liquid through the backwash conduit into the permeate chamber during a cleaning operation; and (f) a means for closing the first valve and opening the second valve when the backwash pump is running, the method comprising:
  (i) closing the first valve and opening the second valve;
  (ii) using said backwash pump and pumping backwash liquid through the backwash conduit, into the permeate chamber, and through the membrane for a predetermined period of time to dislodge foulants which have collected on the membrane; and
  (iii) during said pumping of said backwash liquid, varying the pressure of the backwash liquid flowing through the backwash conduit to create pressure pulses in a periodic fashion by cyclically varying the speed of the backwash pump.

13. In a membrane filtration system comprising:

(a) a source of liquid to be filtered;

(b) a filtration pump having a controllable speed adapted to pump liquid to be filtered from the liquid source through a feed conduit at a controlled rate;

(c) a filtration module having at least one concentrate chamber and at least one permeate chamber which are separated by a filtration membrane wherein said concentrate chamber is adapted for receiving liquid to be filtered from the feed conduit through a liquid inlet opening;

(d) a permeate conduit for carrying liquid which has been passed through the membrane from the concentrate chamber into the permeate chamber out of the permeate chamber through a permeate outlet opening;

(e) a conduit adapted to carry unfiltered liquid out of the concentrate chamber through a concentrate outlet opening;

(f) a source of backwash liquid comprised of filtered liquid;

(g) a backwash pump adapted to pump backwash liquid into the permeate chamber through a backwash opening at a controlled flow rate;

(h) a means for closing the backwash opening and opening the liquid inlet opening and permeate outlet opening when the filtration pump is running, and closing the liquid inlet opening and permeate outlet opening and opening the backwash opening when the backwash pump is running; and (i) first means for controlling the rate at which liquid to be filtered flows into the concentrate chamber when the filtration pump is running, and second means for controlling pressure of the backwash liquid flowing into the permeate chamber when the backwash pump is running;

the first means of controlling the flow of liquid to be filtered comprises a filtration pump speed controller for adjusting the rate at which liquid to be filtered flows to the concentrate chamber by adjusting the speed of the filtration pump, said first means adapted for generating periodic pressure pulses or flow pulses in the liquid entering the concentrate chamber when the filtration pump is operating, said first means comprising a filtration pump speed controller for varying the flow rate of the liquid to be filtered in a periodic fashion by cyclically varying the speed of the filtration pump; and the second means of controlling the pressure of the backwash liquid comprises a backwash pump speed controller adapted to adjust the pressure of the backwash liquid by adjusting the speed of the backwash pump, said second means for generating periodic pressure pulses or flow pulses in the backwash liquid entering the permeate chamber when the backwash pump is operating said second means comprising a backwash pump speed controller for varying the flow rate of the backwash liquid in a periodic fashion by cyclically varying the speed of the backwash pump to create pulses.

14. The system of claim 13 wherein the filtration pump is powered by an electric motor which runs on AC current, and the filtration pump speed controller adjusts the speed of the filtration pump by adjusting the frequency of AC current supplied to the filtration pump motor; and wherein the backwash pump is powered by an electric motor which runs on AC current, and the backwash pump speed controller adjusts the speed of the backwash pump by adjusting the frequency of AC current supplied to the backwash pump motor.

* * * * *